United States Patent [19]

Tazuma et al.

[11] 4,009,228
[45] Feb. 22, 1977

[54] PRIMARY AMINE-MODIFIED ANHYDRIDE RESIN

[75] Inventors: James J. Tazuma, Stow; Joel Muse, Medina, both of Ohio

[73] Assignee: The Goodyear Tire & Rubber Company, Akron, Ohio

[22] Filed: May 12, 1975

[21] Appl. No.: 576,409

[52] U.S. Cl. .................... 260/878 R; 260/876 R; 260/879; 526/49
[51] Int. Cl.² ........................................ C08L 23/36
[58] Field of Search .......... 260/78 A, 78 L, 78 SC, 260/78.4 D, 894, 888, 878 R, 879; 450/610.5, 619.5, 623

[56] References Cited

UNITED STATES PATENTS

| 2,871,137 | 1/1959 | Aldridge et al. | 260/78.4 D |
| 2,993,821 | 7/1961 | Gunberg et al. | 260/78.4 D |
| 3,365,411 | 1/1968 | Mertzweiller et al. | 260/894 |
| 3,687,905 | 8/1972 | Dorer | 260/78.4 D |
| 3,872,064 | 3/1975 | Pace et al. | 260/888 |
| 3,929,737 | 12/1975 | Tazuma et al. | 260/78.4 D |

FOREIGN PATENTS OR APPLICATIONS

| 669,724 | 9/1963 | Canada | 450/619.5 |
| 1,540 | 12/1966 | Japan | 450/619.5 |

OTHER PUBLICATIONS

CA, vol. 64, 1966, 6380 h.

*Primary Examiner*—Paul R. Michl
*Attorney, Agent, or Firm*—F. W. Brunner; H. C. Young, Jr.

[57] ABSTRACT

A resinous composition derived by reacting (A) an amine selected from primary amines and primary diamines with (B) a maleic anhydride-modified piperylene/methyl branched monoolefin backboned resin. Such compositions can be modified by co-reacting with an amino acid or lactam thereof. Said composition can be useful as a tackifier for rubber and thermoplastic products.

13 Claims, No Drawings

PRIMARY AMINE-MODIFIED ANHYDRIDE RESIN

This invention relates to a resinous composition and to its method of preparation. This invention particularly relates to the preparation of resins from primary amines with maleic anhydride modified hydrocarbon resins having a backbone of piperylene and selected branched monoolefins.

Tackifying resins are many times used to provide building tack for various polymeric materials, to provide pressure sensitive adhesive tack for various rubbery polymers and to provide tack for thermoplastics when used for hot melt adhesives. Such tack is generally provided as a physical phenomenon having a tenacity which might be measured by the material's shear and/or peel strength. However, for many applications, such a physical adherence is not of a desirable range for practical utility.

It should be pointed out that, indeed, valuable tackifying resins can be prepared by polymerizing a combination of olefins and diolefins in the presence of a Friedel-Crafts type of catalyst. For example, a unique resin, characterized by having a softening point in the range of about 10° to about 30° C, having a backbone derived from piperylene and 2-methyl-2-butene can be prepared by polymerizing the monomers with boron trifluoride. Such relatively low softening point resins derived from piperylene and selected branch chain monoolefins have been found to have unique utilities in the field of tackifying resins for rubbery materials and particularly in the field of relatively sophisticated pressure sensitive adhesives.

However, such low softening point resins must many times be used as a plasticizing tackifying resin and therefore mixed with other higher softening point tackifiers in order to provide a satisfactory tackifying utility for adhesives and various coatings.

Therefore, it is an object of this invention to provide an enhanced higher softening point resin composition.

In accordance with this invention, a resinous material has been discovered which comprises (A) about 33 to about 67 percent amine-equivalent units derived from a primary amine selected from aliphatic and aromatic mono and diamines, and correspondingly, (B) about 67 to about 33 percent anhydride-equivalent units derived from a maleic anhydride-modified resin, said anhydride-modified resin comprised of about 45 to about 55 mole percent units derived from maleic anhydride and, correspondingly, about 55 to about 45 mole percent units derived from a piperylene/methyl branched monoolefin backboned resin comprising about 40 to about 70 weight percent units derived from piperylene and correspondingly about 60 to about 30 weight percent units derived from at least one methyl branched chain $\alpha$ or $\beta$ monoolefin containing 4 to 6 carbon atoms, where the weight ratio of piperylene to said branched monoolefin is in the range of about 0.8/1 to about 2/1.

The resinous composition of this invention is prepared by the method which comprises reacting (A) about 1 to about 2 amine equivalents of a primary amine selected from at least one of aliphatic and aromatic amines and diamines with, correspondingly, (B) about 2 to about 1 equivalents of a maleic anhydride-modified piperylene/methyl branched monoolefin backboned resin at a temperature in the range of about 25° to about 350° C, preferably about 100° to about 220° C, where said anhydride-modified resin is prepared by the method which comprises the steps of (1) reacting about 30 to about 60 parts by weight maleic anhydride, or reacting about 10 to about 25 parts by weight maleic anhydride if an organoperoxide catalyst is used, at a temperature in the range of about 150° to about 250° C with 100 parts by weight of a hydrocarbon-derived resin having a softening point in the range of about 10° to about 50° C prepared by polymerizing in the presence of a catalyst selected from boron trifluoride and boron trifluoride etherate, a monomer mixture which comprises about 40 to about 70 weight percent piperylene, and correspondingly, about 60 to about 30 weight percent of at least one monoolefin selected from methyl branched chain $\alpha$ or $\beta$ monoolefins containing 4 to 6 carbon atoms, where the weight ratio of piperylene to said branched chain monoolefin is about 0.8/1 to about 2.0/1 and (2) removing unreacted maleic anhydride, if any, preferably by distillation.

Therefore, this invention requires a resin having a backbone of piperylene/methyl branched chain monoolefin, modified with maleic anhydride, and reactively combined with a primary amine. The amount of maleic anhydride typically required in preparing the anhydride-modified resin is substantially reduced by the use of a free radical initiator such as organoperoxides.

In the practice of this invention, a modified resinous material can further be prepared by reacting an amino acid, or its lactam, with the anhydride-modified resin before or after reaction with the primary amine or diamine.

Representative of various aliphatic diamines are 1,2-diaminoethane(ethylene diamine), 1,3-diaminopropane (trimethylenediamine), 1,6-diaminohexane (hexamethylene diamine) and 1,8-diaminooctane.

Representative of various aromatic diamines are o-, m- and p-phenylenediamines, 2,2'-diaminodiphenyldisulfide, 4,4'-diaminodiphenyldisulfide, naphthylene diamines, o-, m- and p-xylenediamines, 3,3'-chloro-4,4'-diaminodiphenylmethane, monochloro-o-, m- and p-phenylenediamines, dichloro-o-, m- and p-phenylenediamines and toluene diamines.

Representative of various aliphatic monoamines are methylamine, ethylamine, propylamines, butylamines, amylamines, hexylamines, cyclobutylamine, cyclopentylamine and cyclohexylamine.

Representative of various aromatic monoamines are aniline, o-, m- and p-toluidines, o-, m- and p-propylanilines, o-, m- and p-ethylaniline, o-, m- and p-butylanilines, o-, m- and p-chloroaniline, o-, m- and p-nitroaniline, dichloroanilines, trichloroanilines, o-, m- and p-aminophenol, o-, m- and p-methoxyaniline, o-, m- and p-ethoxyaniline, o-, m- and p-aminothiophenol, o-, m- and p-dialkylaminoanilines or o-, m- and p- (N,N-dialkylamino)-anilines.

Particularly preferred aromatic diamines are o-, m- and p-phenylenediamines, o-, m- and p-xylenediamines and toluene diamines.

Particularly preferred aliphatic monoamines are methylamine, ethylamine, propylamines, butylamines, amylamines, hexylamines and cyclohexylamines.

Particularly preferred aromatic monoamines are aniline, o-, m- and p-toluidines, o-, m- and p-chloroaniline, o-, m- and p-aminophenol and o-, m- and p-methoxyaniline.

Various methyl branched chain monoolefins having $\alpha$ or $\beta$ double bonds can be used. Representative of such monoolefins are isobutylene, 2-methyl-1-butene, 2-methyl-2-butene, 2-methyl-1-pentene and 2-methyl-2-pentene. The five carbon atoms-containing 2-methyl-1-butene and 2-methyl-2-butene are generally preferred.

The maleic anhydride modification of the hydrocarbon-derived resin backbone is preferably facilitated by reacting maleic anhydride with the resin to an extent sufficient to achieve a resinous product having an acid-number of about 175 to about 350 after excess maleic anhydride removal. Therefore this acid number range is an important measure, test or indicator of the required extent of maleic anhydride modification.

The primary amine modification of the anhydride-modified resin backbone is preferably facilitated by reacting the amine with the modified resin at a temperature in the range of about 25° to about 350° C and more preferably in the range of about 100° to about 220° C. At the elevated temperature range, generally a solvent or additional diluent is not necessary, although good mixing is generally required for reaction control at the early stages of the exothermic reaction itself. If a solvent or diluent is used, the temperature of the reaction could be controlled by a combination of external cooling, or heating, in combination with the boiling point of the solvent selected. Generally, the amine reaction modification can take about 0.1 to about 5 hours. It can be conducted at atmospheric pressure or above or below atmospheric pressure. Indeed, a vacuum can be applied during the latter stages of the reaction to remove water as a byproduct. Also, this reaction can be conducted as a batch process or on a continuous basis. At the conclusion of the reaction, the product can conveniently be recovered, for example, by decanting the molten resin from the reaction vessel. Lower boiling residual materials, if any, can conveniently be removed by vacuum stripping.

The anhydride modification of the basic resin backbone can be conducted at a temperature in the range of about 150° to about 250° C. If a solvent or diluent is used, the temperature of the reaction can be controlled by the boiling point of the solvent selected or carried out in a high pressure vessel. A generally preferred temperature range is about 180° to about 200° C. Typically, the anhydride reaction can take about 3 to about 6 hours. The reaction can be conducted at atmospheric pressure or above atmospheric pressure. Also, the reaction can be conducted as a batch process or on a continuous basis. At the conclusion of the reaction, it is generally desired and typically required to remove any excess maleic anhydride usually by distillation, particularly vacuum distillation, or distillation under a reduced pressure, such as from about 5 to about 500, preferably about 10 to about 100 millimeters mercury at a temperature in the range of about 120° to about 140° C.

It is generally desired that the anhydride reaction be conducted substantially free of organic solvents or diluents. If a solvent is desired, generally up to about 50 weight percent solvent can be used, although preferably a maximum of about 20 weight percent is allowed based on the total medium or mixture consisting of solvent, maleic anhydride and hydrocarbon-derived resin. Representative of various organic solvents are o-dichlorobenzene, decalin, tetralin, diisopropyl benzene, and aromatic solvents boiling in the range of about 150° to about 200° C.

A free radical initiator can be used for the anhydride reaction if desired. If such an initiator is used, usually about 5 to about 15 mole percent is used, based on the said maleic anhydride. Representative of the many various well known free radical initiators are organoperoxides such as di-t-butyl peroxide, di-t-amyl peroxide, t-butyl cumyl peroxide and dicumyl peroxide. Usually, the free radical initiator is added slowly, or incrementally, to the reaction mixture over a period of time, such as about 5 to 180 minutes, in order to maintain control of the reaction. In addition, when an initiator is employed the maleic anhydride to the basic resin backbone weight ratio is typically lowered to about 0.1:1 to about 0.25:1.

The basic hydrocarbon-derived resin for the anhydride/primary amine modification of this invention is characterized by a relatively low softening point in the range of about 10° to about 50° C, particularly and preferably about 10° C to about 40° C, and is the product of polymerizing in the presence of boron trifluoride or boron trifluoride etherate a mixture which comprises about 40 to about 70 weight percent piperylene, and, correspondingly, about 60 to about 30 weight percent of a branched monoolefin selected from methyl branched tertiary $\alpha$ and $\beta$ olefins having from 4 to 6 carbon atoms. It is preferred that the monomer mixture to be polymerized comprises from about 45 to about 65 weight percent piperylene and, correspondingly, about 55 to about 35 weight percent of said methyl branched tertiary monoolefin. Preferably said monoolefin is a methyl branched $\alpha$-olefin containing 5 to 6 carbon atoms. Even more preferably, it is 2-methyl-1-butene or 2-methyl-2-butene.

The basic resin, in addition to its characterized low softening point, may be further characterized by having a viscosity in the range of about 400 to about 1,000,000 and preferably about 1,000 to about 100,000 centipoises (cps) at about 25° C depending somewhat upon the degree of stripping of the resin product to remove light oil-like products and unreacted hydrocarbons. This reference to degree of stripping is not intended to be misleading or ambiguous. Typically, the major portion of the polymerization product is the resin for this invention whereas only a minor portion consists of oil-like products. Reference is made to the degree of stripping only because of the sensitivity of viscosity to very small amounts of low viscosity oil-like products and unreacted hydrocarbons. It is thus desired to strip the product to remove at least about 95 weight percent of such materials. In practice, about 50 to about 85, preferably about 60 to about 80, weight percent of the piperylene/branched olefin mixture is typically converted to the resin.

The characteristic softening point of the maleic anhydride modified basic resin backbone product and of the basic resin itself can be determined by ASTM Method E 28-58 T which might be modified by first cooling the sample below room temperature and then gradually heating it to the resin's softening point, where the softening point is near or below room temperature.

The polymerization reaction for the basic resin is conveniently carried out in the presence of a diluent because it is usually exothermic. Various diluents which are inert in that they do not enter into the polymerization reaction can be used. Representative examples of inert diluents are aliphatic hydrocarbons such as pentane, hexane and heptane and aromatic hydrocarbons such as toluene and benzene. Unreacted hydrocarbons from the reaction mixture itself can be a diluent. The aliphatic and unreacted hydrocarbons are preferred.

A wide range of temperatures can be used for the polymerization reaction for the preparation of the basic resin such as about −50° to about 50° C and preferably in the range of about 0° to about 30° C. The reaction can be carried out at atmospheric or above or below atmospheric pressure. Typically, a satisfactory polymerization can be conducted at atmospheric pressure or at about autogenous pressure developed by the reactants under the operating conditions used. The time of reaction is not particularly of primary importance and can vary from a few minutes to 12 hours or more.

The basic resin backbone polymerizate is typically distilled, by steam distilling for example, to remove light oil-like products, unreacted hydrocarbons and solvent, if used, to yield the product resin.

In the practice of this invention, the catalyst for preparing the basic resin backbone is required to be selected from boron trifluoride and a boron trifluoride etherate. The boron trifluoride etherate catalyst used to prepare the resin is a complex of the type derived from boron trifluoride and an ether having from 2 to about 12, and preferably from 2 to about 6, carbon atoms. The complex is generally represented by the formula:

$$BF_3 \cdot OR_2$$

Representative of various ethers for preparation of the etherate are those having the structure ROR′, where R and R′ are individually selected from saturated alkyl radicals having from 1 to about 6, and preferably about 1 to about 3, carbon atoms, such as methyl, ethyl, n-propyl, isopropyl, n-butyl, isobutyl, sec-butyl, t-butyl, n-pentyl, isopentyl, t-pentyl, isohexyl, n-hexyl and t-hexyl radicals. The ethyl radical is usually preferred. The complex, when not available commercially, can generally be prepared by reacting boron trifluoride gas with an ether in about equimolar quantities in an inert atmosphere at a temperature in the range of about −25° to about 25° C, and usually in the range of about 10° to about 25° C. Representative of various ethers are dimethyl ether, diethyl ether, methyl ethyl ether, di-n-propyl ether, diisopropyl ether, di-n-butyl ether, diisobutyl ether, di-t-butyl ether, di-n-amyl ether, diisoamyl ether, di-t-amyl ether, ethyl amyl ether, diisohexyl ether, di-n-hexyl ether, di-t-hexyl ether and butyl 2-ethyl hexyl ether. Diethyl ether is usually preferred.

The amine-modified anhydride resin of this invention has particular enhanced utility in that it has substituents which are hydrophobic, thus being attracted to hydrocarbon-type derived materials as well as hydrophilic properties which enables it to be attracted to polar materials. Thus, the resin has an enhanced ability to be a good tackifier, or adhesive, for bonding both similar and dissimilar materials such as, for example, rubber, thermoplastic materials as well as fibers and woven and non-woven fabrics derived from cotton, rayon, polyester and nylon.

The practice of the invention is further illustrated by reference to the following examples which are intended to be representative rather than restrictive of the scope of the invention. Unless otherwise indicated, all parts and percentages are by weight.

EXAMPLE I

To a reactor, equipped with a condenser, thermometer, mechanical stirrer, nitrogen inlet tube and water trap, was charged 100 parts of an anhydride-modified piperylene/2-methyl-2-butene backbone resin having an acid number of about 240. The anhydride modified resin was heated to about 110° C under a nitrogen atmosphere following which various amounts of various primary diamines were added over a 1 to 2 minute time period. After the initial exotherm, some heat was necessarily applied to the reaction mixture over a period of about 1 to 5 hours to maintain the mixture at a temperature of about 130° to 180° C and drive off water as a by-product.

The specific primary diamines, reaction times and temperatures as well as yields and softening points are more clearly shown in the following Table 1.

TABLE 1

Reaction of Anhydride-Modified Resin with Diamine

| Exp | Diamine[1] | Weight of Anhydride-Modified Resin (g) | Weight of Diamine (g) | Equivalent Ratio Resin/Diamine | Reaction time (hr) | Reaction Temp (°C) | Yield % | Softening Point (°C)[2] | MN[3] |
|-----|-----------|----------------------------------------|-----------------------|-------------------------------|--------------------|---------------------|---------|------------------------|-------|
| A | 1,8-DAO | 100.01 | 14.07 | 2/1 | 0.1 | 160 | 82 | >150 | — |
| B | 1,8-DAO | 99.98 | 56.24 | 1/2 | 1 | 130 | 99 | —[4] | — |
| C | 1,3-DAP | 100.13 | 21.85 | 2/3 | 1 | 130 | 96 | 76 | 1040 |
| D | 1,3-DAP | 100.16 | 18.14 | 4/5 | 1 | 130 | 99 | 99 | 1130 |
| E | 1,3-DAP | 50.005 | 8.72 | — | 1 | 130 | 96 | 59 | — |
| F | 1,3-DAP | 100.00 | 15.86 | 1/1 | 4 | 180 | 92 | 83 | — |
| G | 1,6-DAH | 100.00 | 24.86 | 1/1 | 4 | 180 | 95 | —[4] | — |
| H | 1,4-PDA | 100.00 | 23.13 | 1/1 | 5 | 220 | 96 | 109 | — |

1. The diamines used in this study were 1,3-diaminopropane (1,3-DAP), 1,6-diaminohexane (1,6-DAH), 1,8-diaminooctane (1,8-DAO) and 1,4-phenylene diamine (1,4-PDA).
2. Ring and Ball softening point (ASTM E-58T)
3. Number average molecular weight in benzene
4. Liquid or softening point below 50° C
5. Reacted 21.53 g of ω-aminoundecanoic acid with 50 g of anhydride modified resin at 130° C for 1 hour before adding the diamine.

The anhydride-modified resin used in this work had an acid number of 240 based on potassium hydroxide measurement. This means that it takes 240 grams of potassium hydroxide to titrate 1000 grams of anhydride-modified resin or 24 grams of titrate to 100 grams of such resin. Since this titration takes 2 moles of potassium hydroxide per mole of anhydride, the number of moles, or equivalents, of anhydride available in 100 grams of modified resin was equal to (24/2)/56.1 = 0.214. Knowing this number, and depending on what equivalent ratio of anhydride to amine was desired, it was possible to calculate how much of each amine or diamine to be used.

EXAMPLE II

To a reactor, equipped with a condenser, thermometer, mechanical stirrer, nitrogen inlet tube and water trap, was charged 104.4 parts (0.185 mole) of an anhydride-modified piperylene/2-methyl-2-butene backboned resin having an acid number of about 207. The anhydride-modified resin was heated to about 130° C under a nitrogen purge following which 36.3 parts aniline were added over a period of about 1 to 2 minutes. The mixture was heated for about one-half hour at about 130° C, following which the temperature was increased to about 180° C for about 1 hour. To the mixture was then added 18.2 more parts aniline, bringing the total aniline addition to about 54.5 parts (0.59 mole), and the resulting mixture heated for an additional 2 hours at about 180° C. The temperature was slowly increased to about 220° C over an one-half hour period and held at this temperature for about 5½ hours. Excess aniline was allowed to distill into the water trap of the Dean-Stark-type. The hot aniline-modified resin was simply decanted to provide a yield of about 82 percent.

Admittedly, the procedure was somewhat cumbersome and it could reasonably be improved by adding aniline slowly, over a period of about ½ to about 1½ hours for example, at a temperature of about 130° to about 140° C. The mixture then could be slowly heated over a period of about 2 to 3 hours to a temperature of about 220° to about 230° C to complete the reaction. Indeed, in order to facilitate a more efficient reaction process, it would be deemed appropriate to utilize an equivalent ratio of mono primary amine to anhydride-modified resin of about 1/1 to about 5/1. Much of this recommendation is based upon the observed result that a considerable amount of the aniline tended to distill out of the mixture during heating. Indeed, remaining mono primary amine at the end of the reaction could be easily stripped out, preferably under vacuum.

As shown in Table 1 of Example I, if desired, an amino acid, or its lactam, can be reacted with the anhydride-modified resin before reacting with the primary amine. In this regard, if such a modification is desired, about 5 to 50 weight percent amino acid, or lactam, is reacted with the anhydride modified resin and the product thereof reacted with the primary amine or diamine.

Representative of various such amino acids are ω-amino carboxylic acids having 2 to 12 carbon atoms and their cyclic lactams. For example, such ω-amino carboxylic acids can have the formula

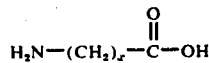

where $x$ is in the range of about 1 to about 12. Representative of various cyclic lactams are those having the general formula

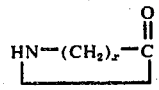

where $x$ is an integer in the range of about 3 to 10, preferably 3 to 6. Particularly representative of such compounds are ω-aminoundecanoic acid and ε-caprolactam.

While certain representative embodiments and details have been shown for the purpose of illustrating the invention, it will be apparent to those having skill in this art that various changes and modifications may be made therein without departing from the spirit or scope of the invention.

What is claimed is:

1. The resinous composition prepared by the method which comprises reacting (A) about 1 to about 2 amine equivalents of a primary amine selected from at least one of the group consisting of aliphatic and aromatic amines and diamines with, correspondingly, (B) about 2 to about 1 equivalents of a maleic anhydride-modified piperylene/methyl branched monoolefin backboned resin at a temperature in the range of about 25° to about 350° C where said anhydride-modified resin is prepared by the method which comprises the steps of (1) reacting about 30 to about 60 parts by weight maleic anhydride, or reacting about 10 to about 25 parts by weight maleic anhydride if an organoperoxide catalyst is used, at a temperature in the range of about 150° to about 250° C with 100 parts by weight of a hydrocarbon-derived resin having a softening point in the range of about 10° to about 50° C prepared by polymerizing in the presence of a catalyst selected from boron trifluoride and boron trifluoride etherate, a monomer mixture which comprises about 40 to about 70 weight percent piperylene, and correspondingly, about 60 to about 30 weight percent of at least one monoolefin selected from methyl branched chain α or β monoolefins containing 4 to 6 carbon atoms, where the weight ratio of piperylene to said branched chain monoolefin is about 0.8/1 to about 2.0/1 and (2) removing unreacted maleic anhydride, if any, preferably by distillation.

2. The resinous composition of claim 1 where said aliphatic diamines are selected from at least one of the group consisting of 1,2-diaminoethane (ethylene diamine), 1,3-diaminopropane, 1,6-diaminohexane and 1,8-diaminooctane, and where said aromatic diamines are selected from o-, m- and p-phenylenediamines, 2,2'-diaminodiphenyldisulfide, 4,4'-diaminodiphenylsulfide, naphthylene diamines, o-, m- and p-xylenediamines, 3,3'-dichloro-4,4'-diaminodiphenylmethane, monochloro-o-, m- and p-phenylenediamines, dichloro-o-, m- and p-phenylenediamines and toluene diamines.

3. The resinous composition of claim 2 where said diamines are selected from the group consisting of o-, m- and p-phenylenediamines, o-, m- and p-xylenediamines and toluene diamines.

4. The resinous composition of claim 1 where said aliphatic primary monoamines are selected from at least one of the group consisting of methylamine, ethylamine, propylamines, butylamines, amylamines, hexylamines, cyclobutylamine, cyclopentylamine, and cyclohexylamine,, and where said aromatic monoamines are selected from aniline, o-, m- and p-toluidines, o-, m- and p-propylanilines, o-, m- and p-ethylaniline, o-, m- and p-butylanilines, o-, m- and p-chloroaniline, o-, m- and p-nitroaniline, dichloroanilines, trichloroanilines, o-, m- and p-aminophenol, o-, m- and p-methoxyaniline, o-, m- and p-ethoxyaniline, o-, m- and p-aminothiophenol, o-, m- and p-dialkylaminoanilines or o-, m- and p-(N,N-dialkylamino)-anilines.

5. The resinous composition of claim 1 where, in said piperylene/methyl branched chain monoolefin backboned resin, said methyl branched monoolefin is primarily selected from isobutylene, 2-methyl-1-butene, 2-methyl- 2-butene, 2-methyl-1-pentene and 2-methyl-2-pentene.

6. The resinous compositions of claim 5 where said methyl branched monoolefin is essentially 2-methyl-2-butene.

7. The resinous composition of claim 6 where said piperylene/2-methyl-2-butene backboned resin has a softening point in the range of about 10° to about 40° C., according to ASTM E 28-58T, prepared by polymerizing piperylene and 2-methyl-2-butene in the presence of a catalyst selected from the group consisting of boron trifluoride and boron trifluoride etherate; where said piperylene/2-methyl-2-butene resin is modified with maleic anhydride in the presence of a free radical initiator; and where said units derived from a primary amine are obtained by reaction of at least one of said primary amines with said maleic anhydride-modified piperylene/2-methyl-2-butene resin.

8. The resinous composition of claim 1 prepared by reacting a material selected from at least one of the group consisting of amino acid and a lactam of an amino acid before or after reaction of said primary amine with said anhydride-modified piperylene/2-methyl-2-butene resin.

9. The resin composition of claim 8 where said amino acid is ω-amino carboxylic acid having the formula

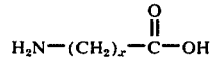

wherein $x$ is in the range of about 1 to about 12 and where said lactam is a cyclic lactam having the general formula

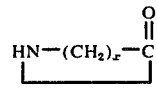

where $x$ is an integer in the range of about 3 to 10.

10. The resin composition of claim 9 where said amino acid is ω-aminoundecanoic acid and said lactam is ε-caprolactam.

11. The resin composition of claim 1 characterized by having a softening point in the range of about 10° to about 40° C and having a viscosity in the range of about 400 to about 1,000,000 centipoises at about 25° C.

12. The resin composition of claim 1 in an admixture comprising a tackifying amount of said resin composition and at least one material selected from the group consisting of rubber and a thermoplastic.

13. The resin composition of claim 8 in admixture with at least one material selected from the group consisting of rubber and a thermoplastic.

* * * * *